Aug. 16, 1938.  D. M. DAVIS  2,127,351

LEAF SPRING UNIT FOR VEHICLES

Filed Aug. 16, 1937  2 Sheets-Sheet 1

INVENTOR:
Donald M. Davis,
BY Alfred E. Ischinger
ATTORNEY.

Aug. 16, 1938.  D. M. DAVIS  2,127,351
LEAF SPRING UNIT FOR VEHICLES
Filed Aug. 16, 1937   2 Sheets-Sheet 2
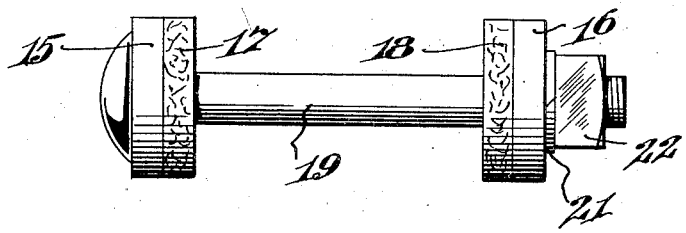
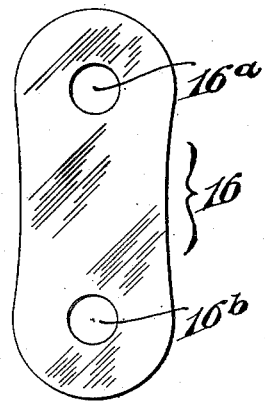
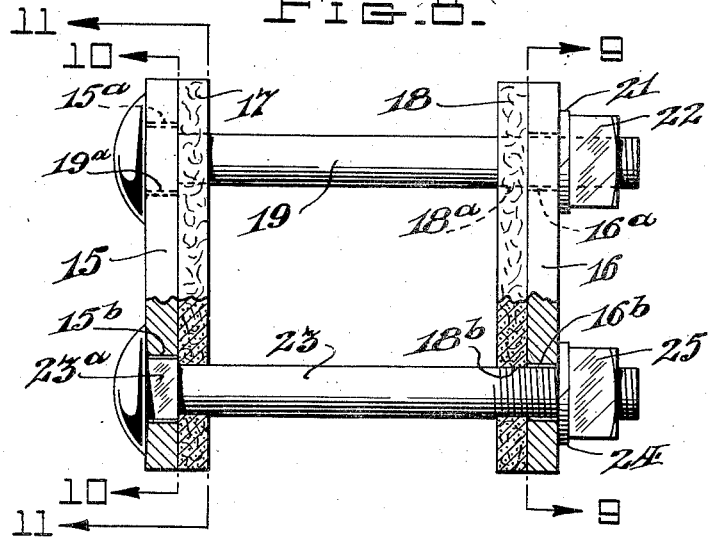
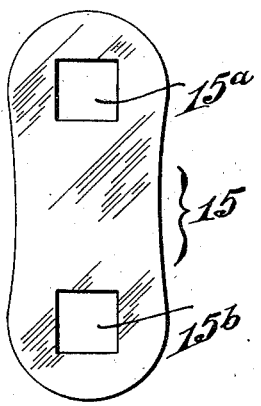
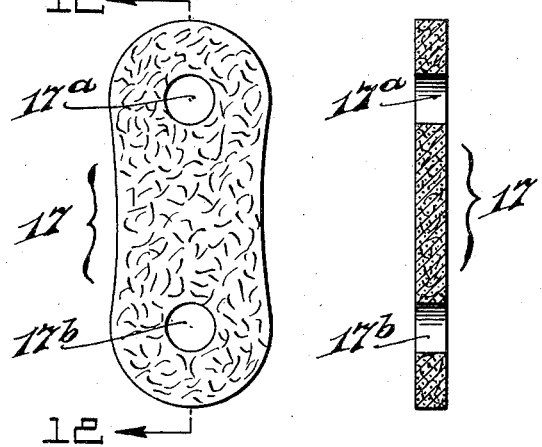
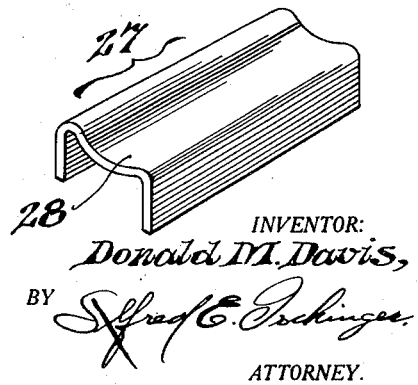
INVENTOR:
Donald M. Davis,
BY
ATTORNEY.

Patented Aug. 16, 1938

2,127,351

UNITED STATES PATENT OFFICE 2,127,351

LEAF SPRING UNIT FOR VEHICLES

Donald M. Davis, Reading, Pa.

Application August 16, 1937, Serial No. 159,427

10 Claims. (Cl. 267—53)

This invention relates to leaf spring units for vehicles, such as automobiles and the like, and to means for effecting positive alignment of the leaves of such units and their maintenance in normal cooperating position with respect to each other.

Leaf spring clamps and devices have heretofore been provided for automobile spring units in an effort to overcome the difficulties and troublesome conditions resulting from improper alignment and abnormal play, or movement, of the leaves of such units. Usually, these difficulties and troublesome conditions manifest themselves in the form of noises such as knocks and squeaks, spring shackle breakage, grinding action between the leaves or the nibs thereof, expelling of spring lubricant, and so on, and while the prior art devices are intended to overcome some of these conditions, they are all more or less unsatisfactory for present day purposes in that they are either adapted for use with special leaf spring units only, or incapable of effecting certain desirable results in connection with modern leaf spring units.

One object of my invention is to provide novel means for the modern leaf spring units of vehicles, such as automobiles and the like, capable of effectively overcoming difficulties and conditions of the referred to character.

Another object is to provide such means which is capable of accomplishing certain desirable results not heretofore accomplished.

Another object is to provide such means which can be quickly and easily applied to modern leaf spring units, either by direct attachment to the leaves, or to the spring covers thereof, and which functions with equal effectiveness in either instance.

A further object is to provide such means for a leaf spring unit which will increase the spring-action efficiency of the unit to a maximum.

Another object is to provide such means which can be utilized for repair purposes in connection with the breakage, or distortion, of the clamps initially provided with such units, and in certain instances involving a special tension leaf.

Another object is to provide such means which is capable of self-adjustment in accordance with the angular shifting, or tilting action of the superposed leaves of a spring unit of an automobile, during certain operating conditions.

A further object is to provide such means which will effectively maintain the leaves of the spring unit in positive vertical and angular alignment without interfering with their normal longitudinal movement.

Another object is to provide such means which is capable of exerting a uniform and evenly distributed gripping force against opposite sides of a group of superposed leaves of a leaf spring unit, irrespective of abnormal variations in the contour of the side edges thereof due to differences in widths of the spring leaves, or for other reasons.

Another object is to provide such means which is simple in construction, inexpensive to manufacture, and consists of rugged wear resisting parts.

An additional object is to provide a novel leaf spring unit for vehicles such as automobiles and the like, having maximum spring-action efficiency.

With these and other objects in view, which will become apparent from the following disclosure of various practical and illustrative embodiments of the invention, the latter comprises the novel elements, features of construction and arrangement of parts in cooperative relationship, as herein described in connection with the accompanying drawings, and hereinafter set forth in the appended claims.

Referring to the drawings:—

Fig. 7 is a plan view of my novel clamp means for effecting various advantageous results in connection with a spring unit;

Fig. 8 is a front elevational view of the device shown in Fig. 7;

Figure 1:
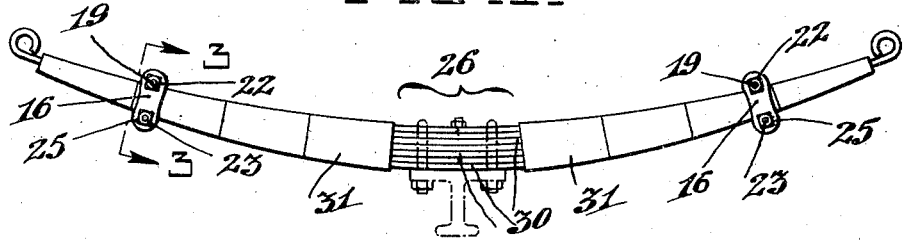
Figure 1 is a side elevational view of a modern automobile spring unit provided with spring covers, and having my invention applied thereto.

Figs. 9, 10, and 11 are cross-sectional views taken as indicated by the arrows 9—9, 10—10 and 11—11, respectively, on Fig. 8;

Fig. 12 is a central cross-sectional view through one of the contour compensating pads of my invention, as seen by looking in the direction of the arrows 12—12 on Fig. 11; and Fig. 13 is a perspective view of one form of the novel spacer or filler element, which forms part of my invention.

My invention comprises novel means for accomplishing various desirable purposes in connection with the leaf spring units of vehicles, such as automobiles and the like. As such, it may be used as a separate attachment to be applied to a spring unit at one or more points, or as a replacement unit for a defective part which performed a clamping function, or as a permanent and integral part of the unit so as to impart to the unit, as a whole, certain new characteristics.

As a separate attachment, one embodiment of my invention comprises a clamp device including a pair of pressure members, indicated by the reference numerals 15 and 16, a pair of yieldable elements 17 and 18, means for pivotally connecting the upper portions of the pressure members such as a screw bolt 19, a lock or spring washer 21 and a nut 22, and similar means for connecting the lower portions of the pressure members 15 and 16, comprising a screw bolt 23, a lock or spring washer 24 and a nut 25.

The pressure members or plates 15 and 16 are of metal of a rigid character so that the clamping action which they exert when moved toward each other will be uniform throughout the entire extent of their clamping surfaces. The plate 15 is provided with two square apertures 15a and 15b to accommodate the square shank portions 19a and 23a of the screw bolts 19 and 23, respectively, thereby to prevent the latter from turning when the nuts on these bolts are rotated into position. Apertures 15a and 15b are of somewhat larger diameter than the bolt portions 19a and 23a so as to form a loose fit therewith and provide a pivotal or rockable connection at their points of juncture with the plate, for a purpose later explained herein.

The plate 16 is provided with circular apertures 16a and 16b, also of a somewhat larger diameter than the circular parts of bolts 19 and 23 so as to form a pivotal or rockable connection between the plate 16 and the bolts at their points of juncture.

The yieldable elements or pads 17 and 18, consist of high grade belt leather, or the like, and are impregnated with oil or a similar substance so as to prevent the pads from drying out or deteriorating and at the same time impart to the leather a lubricated surface which functions to reduce the coefficient of friction between the pads and the spring leaves during longitudinal movement of the latter when the entire spring unit is flexed. Each of the pads 17 and 18 is provided with a circular aperture in its upper and lower portion, as indicated by the reference numerals 17a, 17b and 18a, 18b, respectively, which apertures are in alignment with the apertures in the pressure plates 15 and 16, so as to accommodate the shanks of bolts 19 and 23 which latter function to maintain the pads 17 and 18 in fixed relation with respect to plates 15 and 16 and therefore positively anchored in the clamp device.

The clamp device is similarly applied to a leaf spring unit whether it is provided with one or more spring covers or not. The procedure followed in mounting the device on spring units, such as are generally indicated by the numeral 26 in Figs. 1 and 2, consists of first assembling or combining the pressure plate 15, pad 17, and bolts 19 and 23. Then placing these parts against the spring unit 26 in such manner that bolt 19 extends across the upper surface of the unit, bolt 23 across the bottom thereof, and pad 17 extends vertically across the entire side edge of the unit together with plate 15. Of course these parts are applied to the unit at a point where a group of the leaves 30 approximately fills the space between the bolts 19 and 23. With these parts so placed on the spring unit 26, the second pad 18 and pressure plate 16 are placed on the threaded ends of bolts 19 and 23. Lock or spring washers 21 and 24 are then slipped onto their respective bolts 19 and 23, followed by the mounting thereon of the nuts 22 and 25. With the parts so assembled the nuts 22 and 25 are turned into position or tightened against lock washers 21 and 24 until the pressure plates 15 and 16 have been moved toward each other sufficiently to force the pads 17 and 18 tightly against opposite side edges of the spring unit 26 and until any irregularities in the side edges of the unit are imbedded in the pads 17 and 18.

Figure 3:
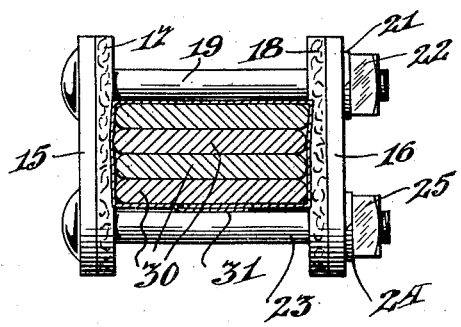
Fig. 3 is a cross-sectional view taken substantially as indicated by the arrows 3—3 on Fig. 1.
Figure 4:
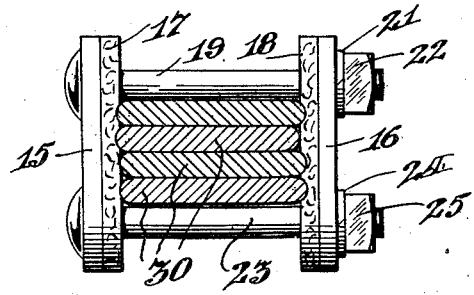
Fig. 4 is a cross-sectional view taken substantially as indicated by the arrows 4—4 on Fig. 2.

Figs. 3 and 4 illustrate the clamp device applied to a spring unit 26 as just described. The irregular side edges or contours of the units 26 are exaggerated for illustrative purposes, and to show how the pads 17 and 18 are moulded under pressure to compensate for irregularities in the side edge outline of the unit, and therefore maintain the uniform clamping pressure of the plates 17 and 18 evenly distributed over the entire extent of the opposite side edges of the unit at all times.

Due to the fact that the pads 17 and 18 are of leather impregnated with oil, they have the proper yielding quality combined with strength and wear resistance to first give sufficiently so as to accommodate or seat the edges of the unit 26, and then to permit normal longitudinal movement of the leaves 30 of the unit in one instance, and in the other instance provide a yielding pressure against the spring cover 31 so as to permit the leaves to move longitudinally with respect to it without undue friction. Impregnation with oil also prevents the leather pads 17 and 18 from deteriorating or powdering and provides sufficient self lubrication so that any movement at their point of application may be smooth and wear resistant. It is to be particularly noted that the pads 17 and 18 are also firmly fixed in position with respect to the pressure plates 15 and 16 by reason of the apertures 17a, 17b and 18a, 18b, through which the shanks of bolts 19 and 23 extend. This arrangement prevents the pads 17 and 18 from being displaced during longitudinal movement of the spring leaves when the unit 26 is flexed, and anchors the pads in the clamp device.

Figure 5:
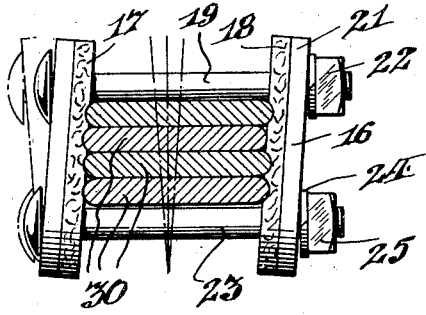
Fig. 5 is a cross-sectional view similar to Fig. 4, and illustrates the self adjusting feature of my invention.

By referring to Fig. 5, it will be noted that due to the loose pivotal or rockable connection between the bolts 19 and 23 and the pressure plates 15 and 16, as previously described, the clamp device as a whole is capable of tilting action, either to the right or left, and during such action maintains the superposed leaves of the unit 26 in normal alignment. This constitutes a distinct feature of my invention and makes it possible for the unit 26 to adjust itself in normal manner and in accordance with the action of the vehicle on which it is mounted, without substantial increase or decrease of aligning pressure being exerted on the side edges of the unit. In this respect, therefore, the clamp device is self-adjusting and permits unusual freedom of action of the spring unit, combined with exertion of even and uniform aligning pressure against the sides of the unit at all times.

Figure 2:
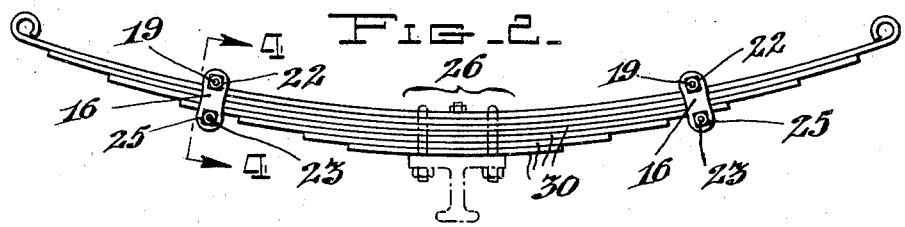
Fig. 2 is a view similar to Fig. 1 but with the spring covers omitted.

From the foregoing, it will be apparent that a spring unit having a pair of my novel clamp devices mounted thereon in the manner shown in Figs. 1 and 2, has certain distinct characteristics and advantages. Such units are therefore considered to come within the purview of my invention.

Certain spring units on modern automobiles are provided with a top leaf of greater curvature than the rest of the leaves, and these are initially held in position by clamps or clips which extend around the entire group of spring leaves and are anchored in place by a bolt having rivet heads, or in other similar manner. Due to the sidewise strains exerted on these clamps, they soon work loose, are distorted, or become otherwise defective. When this happens, it is necessary to replace the clamps in order to avoid the usual spring difficulties resulting from abnormal spring leaf play or movement. Due to the greater curvature of the top leaf, it is ordinarily difficult to replace such a clamp because of the fact that the special top leaf must be gradually pressed down against the other leaves before a clamp can be put into position.

Figure 6:
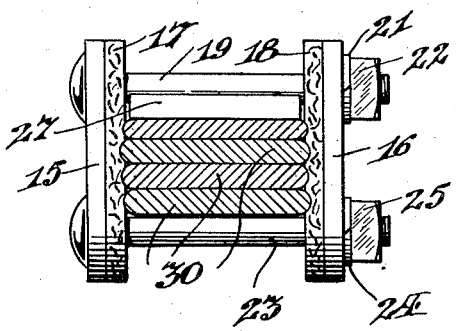
Fig. 6 is a cross-sectional view similar to Fig. 4, and shows a certain spacer or filler element of my invention in cooperative position.

In order that my clamp device may be adapted for this purpose, I have provided a spacer or filler element 27 as shown in Fig. 13. With the aid of this element the substitution of my clamp device on special spring units of the type referred to is greatly facilitated. This will become clear by reference to Fig. 6, in which the parts previously described are indicated by like reference numerals. The spacer 27 is made of a single piece of metal of a length somewhat less than the width of a spring unit 26, of substantially U-shaped cross-section, and provided with a concave groove 28 which extends the entire length of the part connecting the side members or walls, thereof. One way in which this device can be applied is to place the spacer between the upper bolt 19 of my clamp device and the special top leaf 29 of the spring unit in such manner that the bolt rests in the groove 28. With the clamp device so arranged and the pressure plates 15 and 16 released somewhat to permit the device to be moved longitudinally of the spring unit 26, the device can be forced along the unit in the direction in which the unit increases in thickness and until the spacer 27 has gradually forced the special leaf 29 downwardly in position on the unit 26. It will be noted that the groove 28 in the spacer 27 permits angular tilting of the spacer during this procedure without impairing its function as a detent means in retaining the spacer in place with respect to the bolt 19.

Obviously, the spacer 27 may also be otherwise used to advantage in connection with my clamping device.

Of course, the improvements specifically shown and described can be changed and modified in various ways without departing from the invention herein disclosed, and hereinafter claimed.

I claim:

1. A clamp device for a vehicle leaf spring unit, comprising a pair of pressure members each adapted to extend vertically across one of the opposite sides of the unit, a pair of yieldable elements each adapted to be interposed between the unit and one of the pressure members in fixed relation with respect to the latter, pressure member connecting means adapted to extend across the top of the unit and rockably join with one of the members, pressure member connecting means adapted to extend across the bottom of the unit and rockably join with one of the members, and means for moving the pressure members toward each other thereby to force the yieldable elements against the side edges of the unit so as to maintain the said side edges in determinedly aligned relation with respect to each other irrespective of variations in the contour thereof.

2. A clamp device for a vehicle leaf spring unit, comprising a pair of pressure members each adapted to extend vertically across one of the opposite sides of the unit, a pair of yieldable elements each adapted to be interposed between the unit and one of the pressure members in fixed relation with respect to the latter, pressure member connecting means adapted to extend across the top of the unit and rockably join with each of the members, pressure member connecting means adapted to extend across the bottom of the unit and rockably join with each of the members, and means for moving the pressure members toward each other thereby to force the yieldable elements against the side edges of the unit so as to maintain the said side edges in determinedly aligned relation with respect to each other irrespective of variations in the contour thereof.

3. A clamp device for a vehicle leaf spring unit, comprising a pair of rigid pressure plates each adapted to extend vertically across one of the opposite sides of the unit, a pair of yieldable impregnated pads each adapted to be interposed between the unit and one of the pressure plates in fixed relation with respect to the latter, pressure plate connecting means adapted to extend across the top of the unit and rockably join with each of the plates, pressure plate connecting means adapted to extend across the bottom of the unit and rockably join with each of the plates, and means for moving the pressure plates toward each other thereby to force said pads against the side edges of the unit so as to maintain the said side edges in determinedly aligned relation with respect to each other irrespective of variations in the contour thereof.

4. A clamp device for a vehicle leaf spring unit, comprising a pair of rigid pressure plates each adapted to extend vertically across one of the opposite sides of the unit, a pair of oil impregnated leather pads each adapted to be interposed between the unit and one of the pressure plates in fixed relation with respect to the latter, pressure plate connecting means adapted to extend across the top of the unit and rockably join with each of the plates, pressure plate connecting means adapted to extend across the bottom of the unit and rockably join with each of the plates, and means for moving the pressure plates toward each other thereby to force said pads against the side edges of the unit so as to maintain the said side edges in determinedly aligned relation with respect to each other irrespective of variations in the contour thereof.

5. A clamp device for a vehicle leaf spring unit, comprising a pair of metallic plates each adapted to extend vertically across one of the opposite sides of the unit, a pair of oil impregnated leather pads each adapted to be interposed between the unit and one of the plates in fixed relation with respect to the latter, a plate connecting screw bolt adapted to extend across the top of the unit and through enlarged apertures in the upper ends of said plates thereby to effect a rockable connection between the bolts and each plate, a plate connecting screw bolt adapted to extend across the bottom of the unit and through enlarged apertures in the lower ends of said plates thereby to effect a rockable connection between the bolts and each plate, and a nut on each of said bolts for moving the plates toward each other thereby to force said pads against the side edges of the unit so as to maintain said side edges in determinedly aligned relation with respect to each other irrespective of variations in the contour thereof.

6. A clamp device for a vehicle leaf spring unit, comprising a pair of metallic plates each adapted to extend vertically across one of the opposite sides of the unit, a pair of oil impregnated leather pads of substantially similar configuration as said plates each adapted to be interposed between the unit and one of the plates and provided with an aperture in the upper and lower portions thereof, a plate connecting screw bolt adapted to extend across the top of said unit through the apertures in the upper portions of said pads and through enlarged apertures in the upper ends of said plates thereby to effect a rockable connection between the bolt and each plate, a plate connecting screw bolt adapted to extend across the bottom of the unit through the apertures in the lower portions of said pads and through enlarged apertures in the lower ends of said plates thereby to effect a rockable connection between the bolt and each plate, and a nut and spring washer on each of said bolts for drawing the plates toward each other and maintaining the elements of the clamp device in yieldably locked relation with respect to each other.

7. A clamp device for a vehicle leaf spring unit, comprising a pair of similar metallic plates each adapted to extend vertically across opposite sides of the unit, a pair of oil impregnated leather pads of substantially similar configuration as said plates each adapted to be interposed between the unit and one of the plates and provided with a bolt receiving aperture in the upper and lower portions thereof, a plate connecting screw bolt adapted to extend across the top of said unit through the apertures in the upper portions of said pads and through enlarged apertures in the upper ends of said plates thereby to effect a pivotal connection between the bolt and each plate, a plate connecting screw bolt adapted to extend across the bottom of the unit through the apertures in the lower portions of said pads and through enlarged apertures in the lower ends of said plates thereby to effect a pivotal connection between the bolt and each plate, a nut and lock washer on each of said bolts for drawing the plates toward each other and maintaining the elements of the clamp device in positively locked relation with respect to each other, and means for preventing rotary movement of the bolts with respect to the plates.

8. A vehicle leaf spring unit, comprising a plurality of superposed longitudinally extending spring leaves of varying lengths, a pair of clamp devices mounted on said spring leaves intermediate the ends thereof, each of said devices including a pair of pressure members each of which extends vertically across one of the opposite sides of the side edges of a group of said spring leaves, a pair of yieldable elements each of which is interposed between the side edges of said group of spring leaves and a pressure member and held in fixed relation to the latter, pressure member connecting means extending across the top of said group of spring leaves and rockably joined with the upper portions of said members, pressure member connecting means extending across the bottom of said group of spring leaves and rockably joined with the lower portions of said members, and means for moving said members toward each other thereby to force the yieldable elements against the side edges of the unit so as to maintain the said side edges in determinedly aligned relation with respect to each other irrespective of variations in the contour thereof.

9. A vehicle leaf spring unit comprising a plurality of superposed longitudinally extending spring leaves of varying lengths, one or more spring covers encasing certain portions of said leaves, a pair of clamp devices mounted on the spring covers in spaced relationship with respect to each other, said clamp devices including a pair of pressure members each of which extends vertically across one of the opposite sides of the side edges of a spring cover, a pair of yieldable elements each of which is interposed between the side edges of said cover and a pressure member and held in fixed relation to the latter, pressure member connecting means extending across the top of said spring cover and rockably joined with the upper portions of the pressure members, pressure member connecting means extending across the bottom of said cover and rockably joined with the lower portions of said members, and means for moving said members toward each other thereby to force the yieldable elements against the side edges of the unit so as to maintain the said side edges in determinedly aligned relation with respect to each other irrespective of variations in the contour thereof.

10. A clamp device for a vehicle leaf spring unit comprising a pair of pressure members each adapted to extend vertically across one of the opposite sides of the unit, a pair of yieldable elements each adapted to be interposed between the unit and one of the pressure members in fixed relation with respect to the latter, pressure member connecting means adapted to extend across the top of the unit and rockably join with each of the members, spacer means adapted to be interposed between said connecting means and the unit, pressure member connecting means adapted to extend across the bottom of the unit and rockably join with each of the members, and means for moving the pressure members toward each other thereby to force the yieldable elements against the side edges of the unit so as to maintain the said side edges in determinedly aligned relation with respect to each other irrespective of variations in the contour thereof.

DONALD M. DAVIS.